United States Patent
Jarboe et al.

(10) Patent No.: US 6,185,280 B1
(45) Date of Patent: Feb. 6, 2001

(54) LINE IMPEDANCE MATCHING USING DYNAMICALLY GENERATED TRANSFER FUNCTIONS

(75) Inventors: Steve Jarboe, Carrollton; Zhihong Lin, Dallas, both of TX (US)

(73) Assignee: InterVoice Limited Partnership, Reno, NV (US)

( * ) Notice: Under 35 U.S.C. 154(b), the term of this patent shall be extended for 0 days.

(21) Appl. No.: 09/022,737

(22) Filed: Feb. 12, 1998

(51) Int. Cl.[7] .............................. H04M 1/24; H04M 3/08; H04M 3/22

(52) U.S. Cl. ..................... 379/3; 379/6; 379/27; 324/525; 324/527

(58) Field of Search .............................. 379/1, 3, 22, 23, 379/24, 27, 30, 31, 32, 394, 406, 408, 410, 411, 5, 6, 29; 375/220, 222, 257, 224, 227; 371/20.3, 20.5; 324/525, 527, 533, 615

(56) References Cited

U.S. PATENT DOCUMENTS

| | | | |
|---|---|---|---|
| 5,577,097 | * 11/1996 | Meek | 379/3 |
| 5,802,169 | * 9/1998 | Frantz et al. | 379/398 |
| 5,815,568 | * 9/1998 | Trump | 379/386 |
| 5,881,130 | * 3/1999 | Zhang | 379/6 |
| 5,917,853 | * 6/1999 | Greenblatt | 375/222 |
| 6,058,162 | * 5/2000 | Nelson et al. | 379/27 |

* cited by examiner

Primary Examiner—Curtis A. Kuntz
Assistant Examiner—Binh K. Tieu
(74) Attorney, Agent, or Firm—Fulbright & Jaworski L.L.P.

(57) ABSTRACT

A system and method for determining the impedance of a telephone transmission line are disclosed. A test signal is transmitted through a telephone switch to the telephone line and corresponding echo signals are monitored. The test and echo signals are correlated to derive an impulse response. A transfer function for the system is calculated from the impulse response. Then, a transfer function for the transmission line is derived using the system transfer function and the transfer function of the telephone switch. Finally, the transmission line impedance is calculated from the transmission line transfer function. Once the transmission line impedance is known, an impedance matching circuit for the telephone switch can be modified to match the transmission line and the switch.

23 Claims, 1 Drawing Sheet

LINE IMPEDANCE MATCHING USING DYNAMICALLY GENERATED TRANSFER FUNCTIONS

TECHNICAL FIELD OF THE INVENTION

This invention deals generally with the transmission of signals through transmission lines and more specifically to the transition between two-wire and four-wire transmission lines.

BACKGROUND OF THE INVENTION

In a typical switch in a telecommunications system there is an interface between a two-wire transmission line and a four-wire transmission line. The two-wire line provides a connection between the telephone company's central office and the telephone company's customers. The four-wire line is part of the customer's local phone system. One of the functions of the telephone switch is to connect the telephone company's lines and the customer's phone system. Among other considerations, this involves matching the impedance of the customer's switch to the impedance of the telephone company's line. There are chips available which can be programmed to provide a specific impedance between two-wire and four-wire transmission lines. If the impedance of the telephone company's two-wire line is known, then this type of chip can be used to connect the two-wire line to the four-wire line with minimum signal loss and echo.

A limitation in this capability is that the expected line impedance may not equal the actual line impedance. As a result, the two-wire line impedance for which the customer's telephone system and switch are designed will not be correct and when the customer's switch is connected to the telephone company's two-wire transmission line there will be an impedance mismatch. In some cases there will be an echo on the four-wire side due to a mismatch in the impedances of the two-wire and four-wire lines. The mismatched impedance will often attenuate the telephone signals due to the inefficient power transfer across the transmission line interface. Generally, echo signals will also be caused by the mismatched impedance.

This problem may arise if a system is designed for the impedance of a specific two-wire line but it is installed instead on, or moved to, a different two-wire line. In some situations the line impedance may be measured incorrectly or it may be difficult to accurately measure the line impedance.

When a programmable matching chip is used, selecting the wrong impedance can cause other problems in addition to signal attenuation or echo. If the wrong two-wire line impedance is used to generate the matching filter coefficients, that could make the transfer characteristics of the matching circuit significantly worse than they would be if a nominal impedance value was used to generate the filters. On the other hand, use of a nominal impedance value may produce too simple of a matching circuit, thereby significantly distorting the transmitted signals. In some cases, the signal performance can degrade to such an extent that switch hardware, such as a modem, will not work when the wrong impedance is selected.

SUMMARY OF THE INVENTION

These and other problems of the prior art are solved by a system and method which takes advantage of the known characteristics of the telecommunications switch and the matching circuit to determine the actual impedance of a telephone line. The present invention allows a system to dynamically determine the line impedance during installation or operation. Once the two-wire line impedance is known, the system can then reconfigure the front end hybrid matching circuit to match the switch to the two-wire line impedance as precisely as possible in order to optimize the signal transfer between the two-wire and four-wire lines, thereby reducing signal loss and echo.

The present invention operates by transmitting a test signal, such as a white noise signal, over the two-wire telephone line and then recording the echo signal that is reflected from the two-wire line. In the preferred embodiment, the echo signal is synchronously correlated to the transmitted test signal in order to measure any phase delays in addition to the amplitude of the echo signal.

A transfer function is generated by first cross-correlating the test signal input and the echo signal to derive the impulse response for the system. The system impulse response is then Fourier-transformed to derive the transfer function of the system comprising the combination of the customer's telecommunications switch and the telephone company's two-wire line. The transfer function of the telephone switch can be measured using a network analyzer or some other test equipment or it can be calculated from the design specifications. Once the transfer functions of the system and the switch are known, then the transfer function of the two-wire line can be derived by solving the circuit equations for the system. The impedance of the telephone line can be derived from the two-wire line transfer function.

Once the telephone line impedance is determined by this method, the switch's hybrid matching circuit can be modified precisely match the telephone line impedance. In switches with a programmable matching chip, the circuit can be reprogrammed to match the switch to the actual two-wire impedance. Other matching circuits may need to be manually modified to achieve an impedance match to the telephone line.

A technical advantage of the invention is that many existing systems, such as a private branch exchanges (PBX) or voice response units (VRU), already use the programmable matching chip described herein. Therefore, those systems can be adapted to use the present invention. The existing systems would simply need to be modified to apply the method of the present invention to determine the exact line impedance. Once the line impedance is calculated, then the matching circuit can be programmed to match this impedance.

Another technical advantage of the invention is that no additional hardware is required to properly match this impedance because the matching chip which is already installed in a great number of these systems is programmable and may be adapted to employ the present invention.

A further technical advantage of the invention is that this algorithm can be used with any number of systems in order to determine the line impedance. Therefore, even in systems with difficult to adjust, hard-wired impedance matching networks, the present invention is useful for determining the line impedance and for detecting problems that may be corrected by hardware or software modifications.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
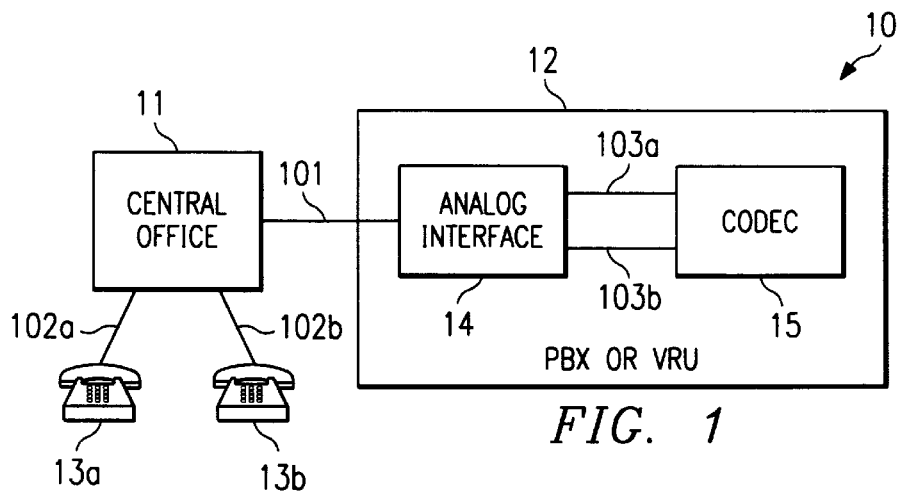
FIG. 1 shows a typical telephone system in which customers are connected through a central office.

FIG. 1 depicts telephone system 10 having customer switch 12. Switch 12 is connected to the telephone company's central office 11 via two-wire line 101. Switch 12 may be a PBX, VRU or other telephone system. Other telephone company customers 13a,b are connected to central office 11 via two-wire lines 102a,b. Switch 12 is comprised of two-wire to four-wire analog interface 14 and codec 15. Codec 15 converts telephone signals between the analog voice signals on two-wire line 101 and the digital samples that are used in the four wire portion of switch 12. Interface 14 and codec 15 are connected via lines 103a,b. Switch 12 is connected to one or more telephone units (not shown) at the customer's location. Digital signals are used in the customer's local system and they are converted to analog signals by codec 15 for transmission on line 101.

Switch 12 is designed to interface with a specific impedance that is expected on line 101. When the impedances of switch 12 and line 101 are properly matched, the signal loss and echo caused by the two-wire to four-wire interface are minimized. Typically, the exact impedance of line 101 is not known, so switch 12 will be designed using an estimated or nominal impedance value for line 101. In some cases, switch 12 may be designed using an impedance which was incorrectly measured on line 101. In either situation, signal loss and echoes will occur due to the impedance mismatch between switch 12 and line 101 when switch 12 is connected to the wrong line impedance.

Figure 2:
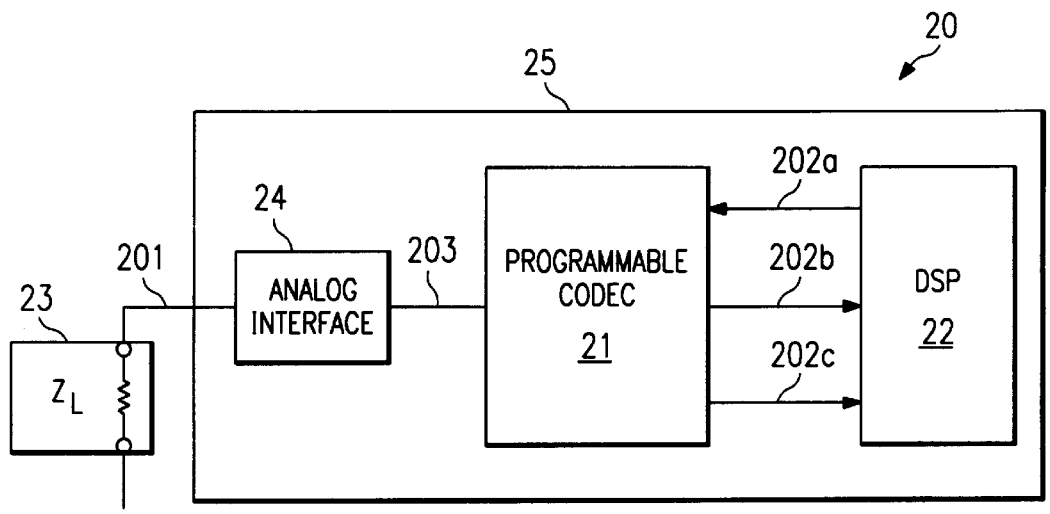
FIG. 2 illustrates a two-wire telephone line connected to a telephone switch embodying the present invention.

In order to correct for impedance mismatches between switch 12 and line 101 and to improve signal transmission characteristics, the present invention measures the actual impedance of line 101 and then adjusts the impedance of the hybrid matching circuit at the front end of switch 12. FIG. 2 shows telephone system 20 in which switch 25 is connected to two-wire line 201 having impedance $Z_L$ 23. Impedance $Z_L$ 23 represents the impedance of line 201 itself plus any impedance caused by devices which are attached to line 201, such as the central office connection or other analog interface connections.

In the preferred embodiment, switch 25 is comprised of programmable codec 21 and digital signal processor (DSP) 22. Programmable codec 21 is a programmable coder-decoder which converts analog voice signals into digital samples. Codec 21 is part of analog line interface circuitry 24. Analog line interface circuitry 24 also comprises well known circuits (not shown) for ring detection and line isolation. Programmable codec 21 also provides the interface between two-wire line 201 and the four-wire line in switch 25. The effective impedance on the two-wire side of programmable codec 21 can be adjusted to match the expected impedance of line 201 and analog circuit 24. Codec 21 incorporates a programmable matching circuit that is designed to match a four-wire switch to the impedance of a two-wire transmission line.

In the preferred embodiment, an Advanced Micro Devices Am79C02/3(A) Dual Subscriber Line Audio-Processing Circuit (DSLAC™ Device) is used for programmable codec 21. The DSLAC™ Device is described in detail in Advanced Micro Devices Publication: #09875, Revision F, Amendment /0, issued June 1992, the disclosure of which is hereby incorporated by reference.

DSP 22 is capable of generating signals for transmission by programmable codec 21. DSP 22 can be an integral part of switch 25, as shown, or it may be an external component that is connected to switch 25. DSP 22 generates a test signal, such as white noise, and provides the test signal over line 202a to programmable codec 21 for transmission on line 201. DSP 22 also monitors the return signal and echoes from codec 21 and line 201 over lines 202b and 202c. DSP 22 or some other part of switch 25, such as a processor or some other hardware circuit (not shown), measures test signal and echo signal parameters and performs the calculations described herein. The measurements and calculations could also be performed by some other component instead of switch 25 if the echo was recorded digitally.

Figure 3:
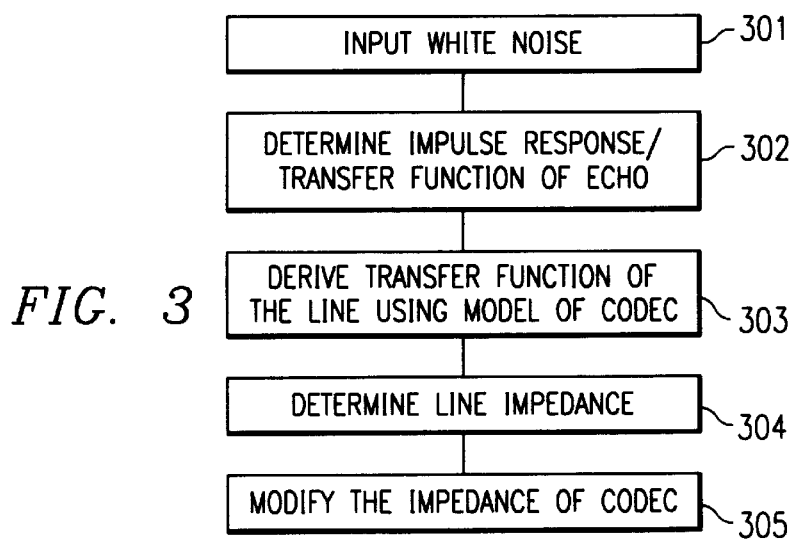
FIG. 3 is a method for determining line impedance using the present invention.

FIG. 3 is the algorithm used by switch 25 to determine the impedance of line 201. The algorithm provides the method by which programmable codec 21 can then be properly matched to line 201. In step 301, DSP 22 generates a white noise test signal and inputs the test signal to programmable codec 21 via line 202a. Programmable codec 21 then converts the digital test signal to an analog signal and transmits it over line 201. Programmable codec 21 can also provide the transmitted test signal back to DSP 22 over line 202b. This would serve as a reference signal and allow DSP 22 to monitor the test signal that is sent over line 201. However, this operation is not required since DSP 22 sent the test signal and, therefore, already knows the signal.

DSP also receives an echo signal from programmable codec 21 over line 202c. This echo signal is generated by the reflection of the test signal that has been transmitted by codec 21 over line 201.

In step 302 the transmitted test signal is cross-correlated with the echo signal to generate a time domain impulse response for system 20. A frequency domain transfer function for system 20, $H_{SYS}(f)$, is then generated from the time domain impulse response by performing a Fourier transform on the impulse response. The system transfer function, $H_{SYS}(f)$, that is generated in step 302 represents the transfer function of a circuit comprising programmable codec 21 coupled to line 201.

The transfer function of the echo due to line 201, $H_L(f)$, is derived in step 303 using the transfer function $H_{SYS}(f)$ generated in step 302 and the transfer function of programmable codec 21, $H_{PC}(f)$. $H_L(f)$ is the transfer function of line 201 in combination with analog interface 24. $H_{SYS}(f)$ is equivalent to $[H_{PC}(f) \times H_L(f)]$. The transfer function of programmable codec 21, $H_{PC}(f)$, is either known from test measurements of switch 25 or it can be calculated from the design parameters of switch 25 and codec 21. By solving the above equation, the transfer function of line 201 can be represented as $H_L(f)=H_{SYS}(f)/H_{PC}(f)$. Since $H_{SYS}(f)$ and $H_{PC}(f)$ are either known or can be calculated, it is possible to derive the value of transfer function $H_L(f)$ for line 201.

Once the transfer function for line 201 is known, it can be used in step 304 to determine the line impedance $Z_L$ 23. This may be done by inverse transforming the transfer function for line 201. Impedance $Z_L$ 23, as calculated in step 304, is then used as a reference to modify the effective impedance of programmable codec 21 in step 305. As a result, the front end of switch 25 will be precisely matched to the impedance of line 201, thereby minimizing the signal loss caused by the line/switch mismatch.

Although the preferred embodiment has been described as using a white noise test signal generated by DSP 22, other test signals may also be used. A white noise signal would provide broad frequency coverage and would allow a more accurate system transfer function to be calculated. However, in the telecommunications field it may be acceptable to use a test signal that is weighted for a specific frequency range, such as the voice range. This would allow the switch and line to be matched in the frequency range in which voice echoes would be noticeable to a user. Echoes and signal loss outside the voice band may not effect the system if it is used only for speech. In other cases, some other frequency range may need to be closely matched to prevent signal loss and echo in that range.

Using a digital signal processor to generate the test signal has the advantage of allowing for repetition of the same test signal for multiple transfer function calculations. However, other sources of random, broad band noise may also be used. As long as a DSP or other signal processing device is able to cross-correlate the transmitted test signal and the test signal echo, the system can generate the transfer function for the switch/line system. As discussed above, once the system transfer function is measured, the line transfer function and impedance can be measured.

In the preferred embodiment, the DSLAC™ device is used to provide matching between switch 25 and line 201. A model of the line interface for switch 25 can be developed using the characteristics of the DSLAC™ and the characteristics of the other components of the switch. In order to simplify the line impedance calculation, some of the internal components of the DSLAC™ device can be disabled or selected out of the circuit since they would not be necessary to the line impedance and transfer function calculation.

Additionally, the DSLAC™ device provides the capability of electronically shorting the circuit and disabling feedback and feedforward filters. When system 20 has a short circuit and the feedback and feedforward filters are disabled, the test signal echo will be reflected back from the point of the short. The present invention can then be used to derive a transfer function $H'_{SYS}(f)$ for that portion of the system between DSP 22 and the short circuit point. The position of the short circuit can be chosen to isolate selected portions of the circuit. The circuit equations can then be solved in the same manner as discussed above using the shorted transfer function and the overall system transfer function. The transfer function $H''_L(f)$ for the portion of the line beyond the short circuit point can be determined from the equation: $H''_L(f)=H_{SYS}(f)/H'_{SYS}(f)$. By shorting two-wire line 201 at selected positions, transfer functions $H'_L(f)$ and $H''_L(f)$ can be determined for various portions of transmission line 201. From these transfer functions, impedances $Z'_L$ and $Z''_L$ can also be calculated for the selected portions of line 201.

Although the present invention and its advantages have been described in detail, it should be understood that various changes, substitutions and alterations can be made herein without departing from the spirit and scope of the invention as defined by the appended claims.

What is claimed is:

1. A method for measuring a transmission line transfer function comprising the steps of:
    transmitting a test signal through a line interface to a transmission line;
    monitoring an echo signal from said transmission line after said echo signal passes through said line interface, wherein said echo signal is related to said transmitted test signal;
    deriving the impulse response from said echo signal and said test signal;
    generating a system transfer function from said system impulse response;
    determining a line interface transfer function;
    calculating said transmission line echo transfer function using said system transfer function and said line interface transfer function.

2. The method of claim 1, further comprising the step of:
    determining a transmission line impedance from said transmission line echo transfer function.

3. The method of claim 2, further comprising the step of:
    adjusting an impedance of said line interface to match said transmission line impedance.

4. The method of claim 3 wherein said transmission line is a telephone line.

5. The method of claim 3 wherein said line interface is a two-wire to four-wire line interface in a telephone switch.

6. The method of claim 3 wherein said line interface is a programmable matching circuit.

7. The method of claim 3 wherein said transmission line is a telephone line and wherein said line interface is a programmable matching circuit.

8. The method of claim 1 wherein said test signal is generated by a digital signal processor.

9. The method of claim 1 wherein said test signal is generated by a computer.

10. The method of claim 1 wherein said test signal is generated by an embedded hardware circuit.

11. The method of claim 1 wherein said test signal is generated from a digital noise recording.

12. The method of claim 1 further comprising the steps of:
    creating a short circuit in said transmission line at a selected position;
    monitoring a second echo signal from said shorted transmission line after said second echo signal passes through said line interface;
    correlating said test signal and said second echo signal to generate a shorted system impulse response for a system comprising said line interface in combination with said shorted transmission line;
    generating a shorted system transfer function from said shorted system impulse response;
    calculating a shorted transmission line transfer function using said shorted system transfer function and said line interface transfer function, wherein said shorted transmission line is the a portion of said transmission line between said short circuit and said line interface.

13. The method of claim 12 further comprising the steps of:
    calculating a remaining line transmission function from said shorted line transmission function and said transmission line transfer function, wherein said remaining line is a portion of the transmission line not including said shorted transmission line.

14. A system for determining a transfer function for a transmission line comprising:
   means for generating a test signal;
   line interface means connecting said test signal generating means and said transmission line;
   means for transmitting said test signal through said interface means to said transmission line;
   means for monitoring an echo signal from said transmission line after said echo signal passes through said line interface means, wherein said echo signal corresponds to said transmitted test signal;
   means for correlating said test signal and said echo signal to generate a system impulse response;
   means for generating a system transfer function from said system impulse response;
   means for calculating a transmission line transfer function using said system transfer function and a line interface means transfer function.

15. The system of claim 14 further comprising:
   means for calculating a transmission line impedance from said transmission line transfer function.

16. The system of claim 15 wherein an impedance of said line interface means is modified to match said transmission line impedance.

17. The system of claim 16 wherein said transmission line is a telephone line.

18. The system of claim 16 wherein said line interface means is a two-wire to four-wire interface in a telephone system switch.

19. The system of claim 16 wherein said line interface means is a programmable matching circuit.

20. The system of claim 14 wherein said test signal generating means is a digital signal processor.

21. A system for determining the impedance of a telephone transmission line comprising:
   a switch connecting a local telephone system to a telephone transmission line, wherein said switch provides a conversion between analog signals on said telephone transmission line and digital signals on said local telephone system; and
   a digital signal processor for generating a test signal and for transmitting said test signal over said transmission line, wherein said digital signal processor monitors an echo signal corresponding to said transmitted test signal, and wherein said digital signal processor correlates said transmitted test signal and said echo signal to generate an impulse response;
   wherein a system transfer function is derived from said impulse response, said transfer function representing the frequency domain transfer function of said switch in combination with said transmission line; a transmission line transfer function is derived from said system transfer function and a transfer function of said switch; and a transmission line impedance is calculated from said transmission line transfer function.

22. The system of claim 21 further comprising:
   a programmable matching circuit, wherein said programmable matching circuit provides an impedance match between said switch and said transmission line.

23. The system of claim 22 wherein said programmable matching circuit is modified to match said calculated transmission line impedance.

* * * * *